United States Patent [19]

Oyadomari et al.

[11] Patent Number: 5,293,492
[45] Date of Patent: Mar. 8, 1994

[54] DATA PROCESSING SYSTEM CAPABLE OF STORING FIRMWARE DATA IN CONTROL MEMORIES OF AN INPUT-OUTPUT PROCESSOR WITH REDUCED HARDWARE

[75] Inventors: Hajime Oyadomari; Toru Fukuta, both of Tokyo, Japan

[73] Assignee: NEC Corporation, Tokyo, Japan

[21] Appl. No.: 401,162

[22] Filed: Aug. 31, 1989

[30] Foreign Application Priority Data

Aug. 31, 1988 [JP] Japan .................. 63-214789

[51] Int. Cl.$^5$ .......................................... G06F 13/12
[52] U.S. Cl. .......................... 395/275; 364/238.3; 364/239.7; 364/241.9; 364/242.3; 364/DIG. 1
[58] Field of Search ... 364/200 MS File, 900 MS File, 364/238.3, 239.7, 240.1, 241.7, 241.9, 242.3; 395/275, 425, 800, 375, 575

[56] References Cited

U.S. PATENT DOCUMENTS

| | | | |
|---|---|---|---|
| 3,710,324 | 1/1973 | Cohen et al. | 340/172.5 |
| 4,042,914 | 8/1977 | Curley et al. | 395/375 |
| 4,172,281 | 10/1979 | Gordon | 395/375 |
| 4,325,119 | 4/1982 | Grandmaison et al. | 395/375 |
| 4,616,311 | 10/1986 | Sato | 364/200 |
| 4,665,482 | 5/1987 | Murray, Jr. et al. | 364/200 |
| 4,783,730 | 11/1988 | Fischer | 364/200 |
| 4,803,623 | 2/1989 | Klashka et al. | 395/275 |
| 4,910,666 | 3/1990 | Nibby, Jr. et al. | 395/575 |
| 4,914,576 | 4/1990 | Zelley et al. | 395/575 |
| 4,928,223 | 5/1990 | Dao et al. | 385/375 |
| 5,014,194 | 5/1991 | Itoh | 364/200 |
| 5,113,500 | 5/1992 | Talbott et al. | 395/325 |

OTHER PUBLICATIONS

Practical Digital Design Using ICs by Greenfield, 1983 pp. 332–337.
High-Performance Computer Architecture by Stone, 1987 pp. 278–312.

Primary Examiner—Gareth D. Shaw
Assistant Examiner—Dennis M. Butler
Attorney, Agent, or Firm—Foley & Lardner

[57] ABSTRACT

In a data processing system having a data path (30) between a memory device (11) and input-output devices (12), and a holding device (18) for holding first through N-th firmware data, where N represents an integer greater than one, an input-output processor (13) comprises first through N-th control memory layers of control memories (31, 32, 33) and a data controller (34) connected to the holding device. Responsive to a firmware load instruction (23), the data controller reads the first through the N-th firmware data from the holding device as first through N-th read-out data. The holding device makes the memory device memorize the first through the N-th read-out data as first through N-th memorized data. Connected to the control memories, the data controller makes the control memories of the first through the N-th control memory layers memorize the first through the N-th memorized data through the data path. In this event, the data controller makes at least one control memory of each of the first through the N-th control memory layers simultaneously memorize each of the first through the N-th memorize data. The holding device may be included in one of the input-output devices. The firmware data may be stored in the control memories successively from the first control memory layer to the N-th control memory layer. Alternatively, storage of the firmware data may be made from the N-th control memory layer to the first control memory layer.

10 Claims, 4 Drawing Sheets

DATA PROCESSING SYSTEM CAPABLE OF STORING FIRMWARE DATA IN CONTROL MEMORIES OF AN INPUT-OUTPUT PROCESSOR WITH REDUCED HARDWARE

BACKGROUND OF THE INVENTION

This invention relates to a data processing system comprising an input-output processor having control memories with a hierarchical relationship.

A data processing system of the type described, includes a memory device, input-output devices, a first data path between the memory device and the input-output devices, and an input-output processor. The input-output device may be a disk memory device, a magnetic tape memory device, or a display device. The input-output processor comprises first through N-th control memory layers, where N represents an integer greater than one. Each of the first through the N-th control memory layers comprises at least one control memory connected to the first data path. That is, a hierarchy exists among the control memories.

The data processing system comprises a holding device for holding first through N-th firmware data corresponding to the first through the N-th control memory layers. The data processing system is for transferring input-output data between the memory device and the input-output devices through the first data path under control of the input-output processor when the first through the N-th firmware data are stored in the control memories of the first through the N-th control memory layers, respectively.

As will later be described, a conventional data processing system comprises, separately from the first data path, second data paths, each of which connects the holding device and each of the control memories of the first through the N-th control memory layers. The second data paths are used in transferring the first through the N-th firmware data to the control memories of the first through the N-th control memory layers, respectively.

The number of the second data paths is increased with an increase in the number of the control memory layers and with an increase in the number of the control memories of each control memory layer. Thus, provision of the second data paths renders hardware of the data processing system complicated.

When only one control memory is included in each control memory layer, the first through the N-th firmware data are successively stored in the control memories of the first through the N-th control memory layers through the second data paths, respectively. It will be assumed that an increased number of the control memories are included in the N-th control memory layer. In this case, the N-th firmware data are successively stored in the control memories of the N-th control memory layer through the second data path. A long time is wasted to complete storage of the firmware data in all control memories of the input-output processor when the number of the control memories of each control memory layer is increased.

SUMMARY OF THE INVENTION

It is therefore an object of this invention to provide a data processing system which comprises simplified hardware.

It is another object of this invention to provide a data processing system of the type described, which is capable of removing conventional data paths which are exclusively used in transferring firmware data from a holding device to control memories of an input-output processor.

It is still another object of this invention to provide a data processing system of the type described, which is capable of completing storage of the firmware data in the control memories of control memory layers of the input-output processor efficiently even when the number of the control memories of each of the control memory layers is increased.

Other objects of this invention will become clear as the description proceeds.

On describing the gist of this invention, it is possible to understand that a data processing system includes a memory device, input-output devices, a data path between the memory device and the input-output devices, holding means for holding first through N-th firmware data, and an input-output processor comprising first through N-th control memory layers corresponding to the first through the N-th firmware data, where N represents an integer greater than one. Each of the first through the N-th control memory layers comprises at least one control memory connected to the data path. The data processing system is for transferring input-output data between the memory device and the input-output devices through the data path under control of the input-output processor when the first through the N-th firmware data are stored in the control memories of the first through the N-th control memory layers, respectively.

According to this invention, the input-output processor comprises data controlling means connected to the holding means and responsive to a firmware load instruction for issuing a read-out command for the first through the N-th firmware data to be read from the holding means as first through N-th read-out data, respectively. The holding means is connected to the memory device and responsive to the read-out command to make the memory device memorize the first through the N-th read-out data as first through N-th memorized data, respectively. The data controlling means is connected to the control memories of the first through the N-th control memory layers to make the control memories of the first through the N-th control memory layers memorize the first through the N-th memorized data, respectively, through the data path.

According to an aspect of this invention, the holding means is included in one of the input-output devices with the holding means connected to the data path. The input-output processor comprises data controlling means connected to the holding means and responsive to a firmware load instruction for issuing a read-out command for the first through the N-th firmware data to be read from the holding means as first through N-th read-out data, respectively. The data controlling means is connected to the control memories of the first through the N-th control memory layers to make the control memories of the first through the N-th control memory layers memorize the first through the N-th read-out data, respectively, through the data path.

According to another aspect of this invention, the holding means is included in one of the input-output devices with the holding means connected to the data path. The input-output processor comprises data controlling means operatively connected to the data path through a control memory connected to the data path and responsive to a firmware load instruction for reading issuing a read out command for the first through the N-th firmware data to be read from the holding means as first through N-th read-out data, respectively. The data controlling means is connected to the control memories of the first through the N-th control memory layers to make the control memories of the first through the N-th control memory layers memorize the first through the N-th read-out data, respectively, through the data path.

DESCRIPTION OF THE PREFERRED EMBODIMENTS

Figure 1:
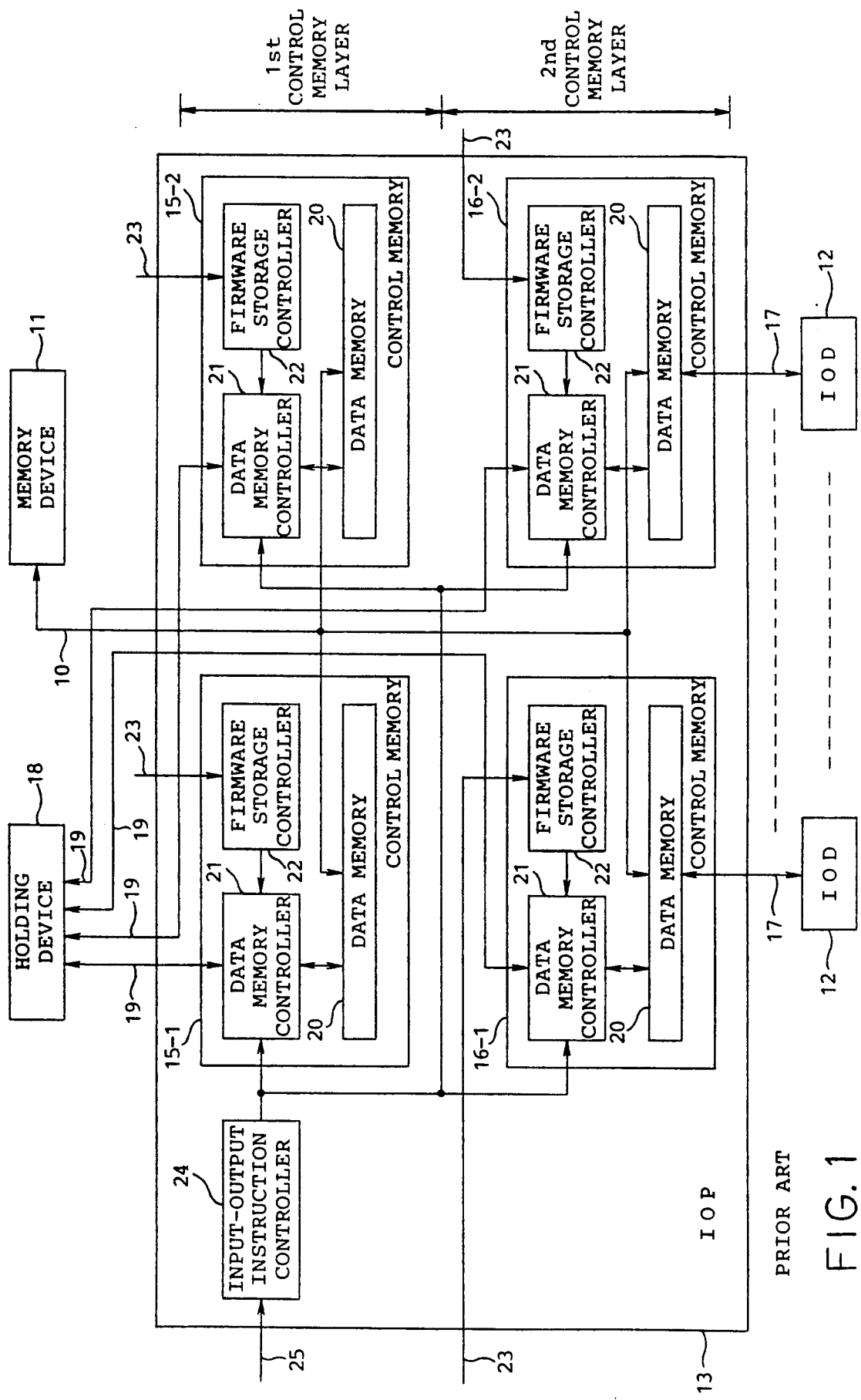
FIG. 1 is a block diagram of a conventional data processing system.

Referring to FIG. 1, a conventional data processing system will be described at first for a better understanding of this invention. The conventional data processing system is equivalent to a data processing system which is described in the preamble of the instant specification.

The conventional data processing system comprises a primary data path 10, a memory device 11, a plurality of input-output devices 12, and an input-output processor 13 labelled IOP. Each of the input-output devices 12 is labelled IOD. The memory device 11 is connected to the primary data path 10.

The input-output processor 13 comprises first through N-th control memory layers, where N represent an integer greater than one. In the example being illustrated, N is equal to two. Each of the control memory layers comprises at least one control memory. In the example being illustrated, the first control memory layer comprises two control memories 15-1 and 15-2. Likewise, the second control memory layer comprises two control memories 16-1 and 16-2. Each of the control memories 15 (suffixes omitted) of the first control memory layer is connected to the primary data path 10. Likewise, each of the control memories 16 (suffixes omitted) of the second control memory layer is connected to the primary data path 10.

The input-output devices 12 are connected to local data paths 17, respectively. The local data paths 17 are connected to the control memories 16-1 and 16-2 of the N-th control memory layer. A combination of the primary data path 10 and the local data paths 17 connected to the primary data path 10 through the control memories 16 is referred to as a first data path which operatively connects the memory device 11 and the input-output devices 12 together.

A holding device 18 holds first through N-th firmware data corresponding to the first through the N-th control memory layers. In the example being illustrated, the holding device 18 holds first and second firmware data because the input-output processor 13 comprises the first and the second control memory layers. The holding device 18 is, for example, a memory device which is similar to the memory device 11.

Second data paths 19 are equal in number to the control memories 15 and 16 of the input-output processor 13. In the example being illustrated, the number of the second data paths 19 is four. The second data paths 19 are for connecting the holding device 18 to the respective control memories 15 and 16.

In the manner which will presently be described in detail, the first firmware data are first stored successively in the control memories 15-1 and 15-2 of the first control memory layer through the second data paths 19 and, thereafter, the second firmware data are successively stored in the control memories 16-1 and 16-2 of the second control memory layer through the second data paths 19.

Attention will be directed to the control memory 15-1 of the first control memory layer. Although description will hereunder be made only as regards the control memory 15-1, each of other control memories 15-2, 16-1, and 16-2 comprises similar parts which will be designated by like reference numerals and are likewise operable.

The control memory 15-1 comprises a data memory 20, a data memory controller 21, and a firmware storage controller 22. Supplied with a firmware load instruction 23 from a central processing unit, namely, a CPU (not illustrated) of the data processing system, the firmware storage controller 22 produces a firmware load request.

Responsive to the firmware load request, the data memory controller 21 delivers a firmware data request to the holding device 18 through the second data path 19. Responsive to the firmware data request, the holding device 18 delivers the first firmware data to the data memory controller 21 through the second data path 19. The data memory controller 21 stores the first firmware data in the data memory 20. Thus, the data memory controller 21 controls storage of the first firmware data in the data memory 20.

Subsequently, the first firmware data are stored in the data memory 20 of the control memory 15-2 of the first control memory layer in the similar manner. Thereafter, the second firmware data are successively stored in the data memories 20 of the control memories 16-1 and 16-2 of the second control memory layer.

When storage operation of the firmware data comes to an end for the data memories 20 of the control memories 15 and 16, the data processing system comes to a ready state. In the ready state, the data processing system is capable of carrying out transfer of input-output data between the memory device 11 and the input-output devices 12 through the primary and the local data paths 10 and 17 (namely, the first data path) under control of the control memories 15 and 16 of the input-output processor 13.

More specifically, each of the data memories 20 of the control memories 15 and 16 is connected to the primary data path 10. The data memories of the control memories 16-1 and 16-2 are connected to the local paths 17. An input-output instruction controller 24 is connected to the data memory controllers 21 of the control memories 15 and 16. Responsive to an input-output instruction 25 produced by the central control unit, the input-output instruction controller 24 controls the data memory controllers 21 of the control memories 15 and 16 to write and/or read the input-output data in and/or from the data memories 20 of the control memories 15 and 16. In this manner, the input-output data are transferred between the memory device 11 and the input-output devices 12 by the use of the first data path, namely, the primary and the local data paths 10 and 17, under control of the control memories 15 and 16.

In the manner described in the preamble of the instant specification, the data processing system is, however, defective in that provision of the second data paths 19 renders hardware of the data processing system complicated. In addition, it needs much time to complete storage of the firmware data in all of the control memories 15 and 16 when the number of the control memories 15 and 16 of each control memory layer is increased. This is because the firmware data are individually and successively stored in the control memories of each control memory layer.

Figure 2:
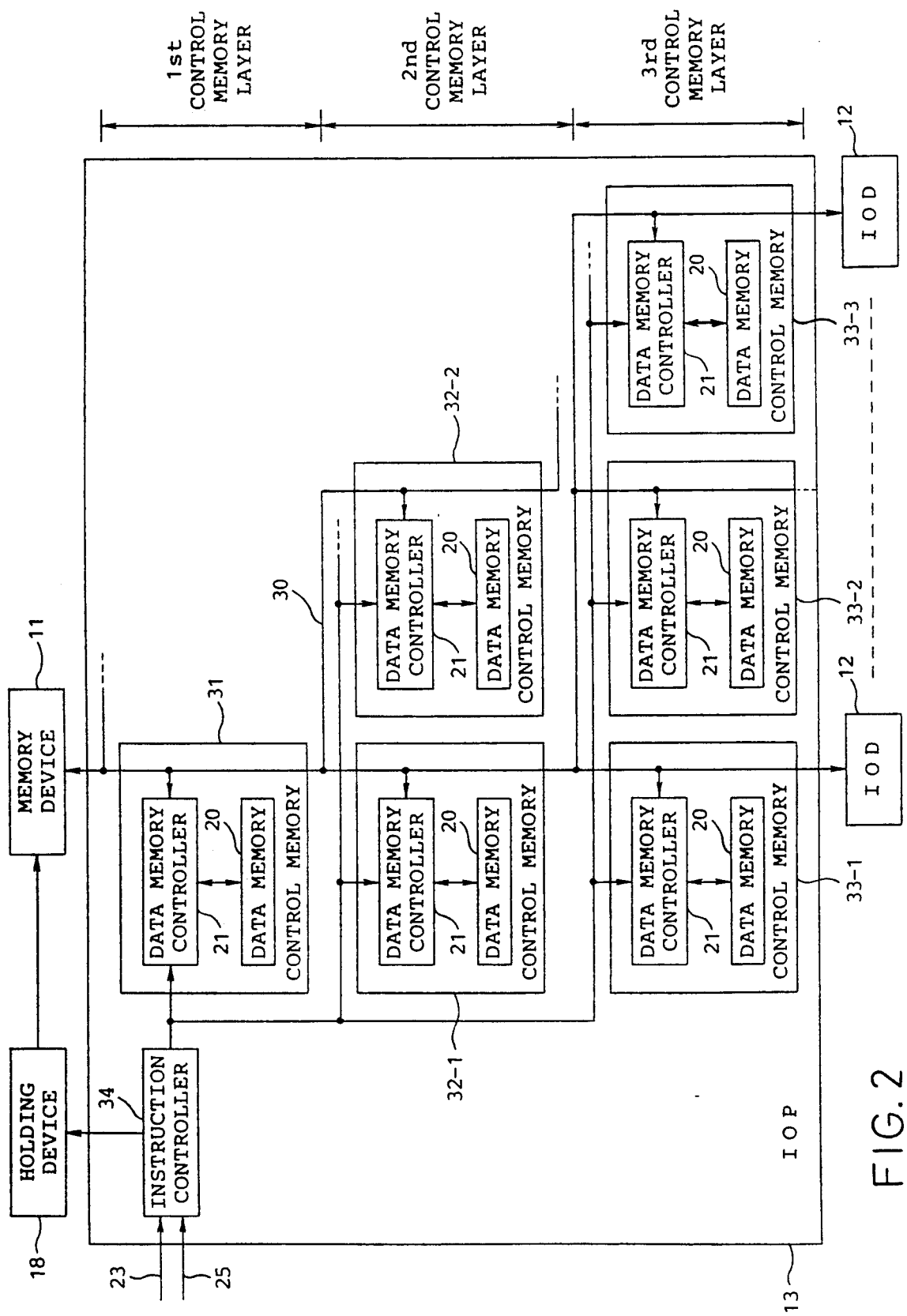
FIG. 2 is a block diagram of a data processing system according to a first embodiment of this invention.

Referring to FIG. 2, a data processing system according to a first embodiment of this invention comprises similar parts designated by like reference numerals. The data processing system comprises a data path 30 between the memory device 11 and the input-output devices 12. The data path 30 corresponds to the first data path which is a combination of the primary and the local paths 10 and 17 of the data processing system illustrated in FIG. 1.

In the example being illustrated, the input-output processor 13 comprises first, second, and third control memory layers. The first control memory layer comprises only one control memory 31 connected to the data path 30. The second control memory layer comprises control memories 32-1 and 32-2 connected to the data path 30 while the third control memory layer comprises control memories 33-1, 33-2, and 33-3 connected to the data path 30. Like in the data processing system illustrated with reference to FIG. 1, each of the control memories 31, 32, and 33 is similar in structure and operation. The holding device 18 holds first through the third firmware data corresponding to the first through the third control memory layers.

An instruction controller 34 is connected to the holding device 18. The instruction controller 34 will be referred to as a data controller. Responsive to the firmware load instruction 23, the instruction controller 34 reads the first through the third firmware data from the holding device 18 as first through third read-out data, respectively.

The holding device 18 is connected to the memory device 11 to make the memory device 11 memorize the first through the third read-out data as first through third memorized data, respectively.

The instruction controller 34 is connected also to the control memories 31, 32 (suffixes omitted), and 33 (suffixes omitted) of the first through the third control memory layers to make the control memories 31, 32, and 33 of the first through the third control memory layers memorize the first through the third memorized data, respectively, through the data path 30.

In this event, the instruction controller 34 can make the control memories 32 of the second control memory layer simultaneously memorize the second memorized data through the data path 30. Likewise, the instruction controller 34 can make the control memories 33 of the third control memory layer simultaneously memorize the third memorized data through the data path 30.

In FIG. 2, the control memories 31, 32, and 33 of the first through the third control memory layers are connected to the data path 30 with each control memory of an n-th control memory layer connected to the data path 30 farther from the memory device 11 than an (n−1)-th control memory layer, where n represents each of natural numbers between two and three which is equal to the number of the control memory layers of the input-output processor 13. In this case, the instruction controller 34 makes at least one control memory of each of the first through the third control memory layers simultaneously memorize a corresponding one of the first through the third memorized data through the data path 30 successively from the first control memory layer to the third control memory layer. Alternatively, the instruction controller 34 may control storage of the firmware data in the control memories 31, 32, and 33 from the third control memory layer to the first control memory layer.

Each of the data memory controllers 21 of the control memories 31, 32, and 33 is connected to the data path 30. The instruction controller 34 is connected to the data memory controller 21 to make the data memory controller 21 store each of the first through the third memorized data in the data memory 20 of at least one control memory of a corresponding one of the first through the third control memory layers through the data path 30 in the manner which will hereunder be described more in detail.

Responsive to the firmware load instruction 23, the instruction controller 34 delivers a firmware load command to the data memory controller 21 of the control memory 31 of the first control memory layer. Simultaneously, the instruction controller 34 gives the holding device 18 a read-out command to make the holding device 18 deliver the first firmware data to the memory device 11 as the first read-out data. The memory device 11 memorizes the first read-out data as the first memorized data.

Responsive to the firmware load command, the data memory controller 21 of the control memory 31 delivers a firmware data request to the memory device 11 through the data path 30. Responsive to the firmware data request, the memory device 11 delivers the first memorized data to the data memory controller 21 of the control memory 31 through the data path 30. The data memory controller 21 of the control memory 31 stores the first memorized data in the data memory 20 of the control memory 31.

When storage operation of the first firmware comes to an end for the control memory 31 of the first control memory layer, the instruction controller 34 delivers the firmware load command to the data memory controllers 21 of the control memories 32 of the second control memory layer and gives the holding device 18 the firmware load command to make the holding device 18 deliver the second firmware data to the memory device 11 as the second read-out data. In the similar manner, the memory device 11 delivers the second memorized data corresponding to the second read-out data to the data memory controllers 21 of the control memories 32 through the data path 30. The second memorized data are simultaneously stored in the data memories 20 of the respective control memories 32 by the data memory controllers 21 of the control memories 32 under control of the control memory 31 of the first control memory layer.

Likewise, the third memorized data are simultaneously stored in the data memories 20 of the respective control memories 33 of the third control memory layer by the data memory controllers 21 of the control memories 33 under control of the control memory 31.

When storage operation comes to an end for the control memories 31 to 33 of all control memory layers, the data processing system comes to the ready state like the data processing system illustrated with reference to FIG. 1. When the instruction controller 34 receives the input-output instruction 25 in the ready state, the instruction controller 34 controls the data memory controllers 21 of the control memories 31 to 33 to write and/or read the input-output data in and/or from the data memories 20 of the control memories 31 to 33. In this manner, the input-output data are transferred between the memory device 11 and the input-output devices 12 through the data path 30 under control of the control memories 31 to 33.

Figure 3:
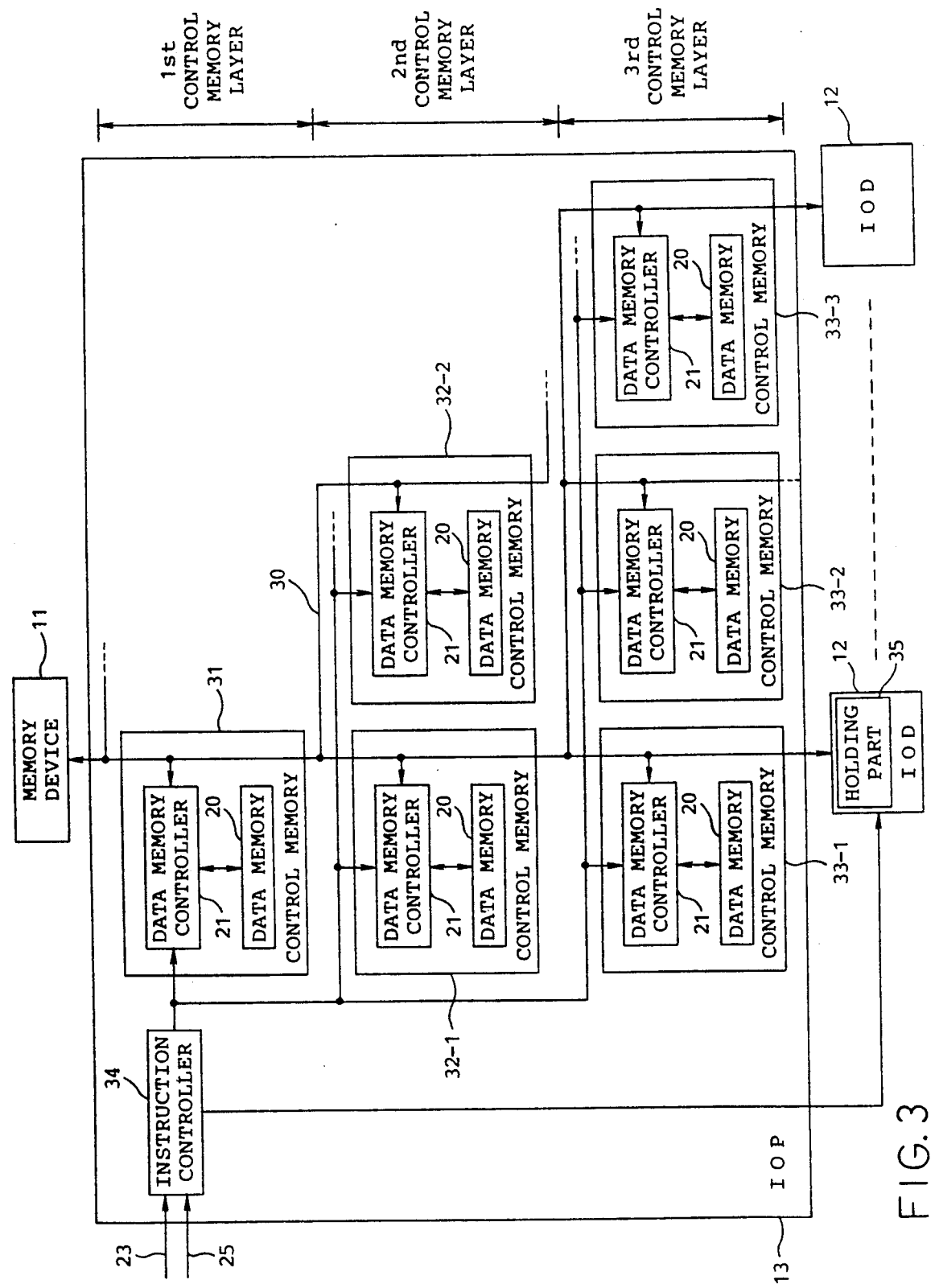
FIG. 3 is a block diagram of a data processing system according to a second embodiment of this invention.

Referring to FIG. 3, a data processing system according to a second embodiment of this invention is similar to the data processing system illustrated in FIG. 2 except that one of the input-output devices 12 includes a holding part 35 for use in holding first through the third firmware data which are held in the holding device 18 illustrated in FIG. 2 and that the holding part 35 is connected to the data path 30 and to the instruction controller 34. The input-output device 12 is, for example, a disk memory device.

In response to the firmware load instruction 23, the instruction controller 34 reads the first through the third firmware data from the holding part 35 as first through third read-out data, respectively. Subsequently, the instruction controller 34 makes the control memories 31, 32, and 33 of the first through the third control memory layers memorize the first through the third read-out data, respectively, through the data path 30.

In this event, the second read-out data are simultaneously stored in the control memories 32 of the second control memory layer. Likewise, the third read-out data are simultaneously stored in the control memories 33 of the third control memory layer. The data processing system operates in the manner similar to the data processing system illustrated in FIG. 2.

Figure 4:
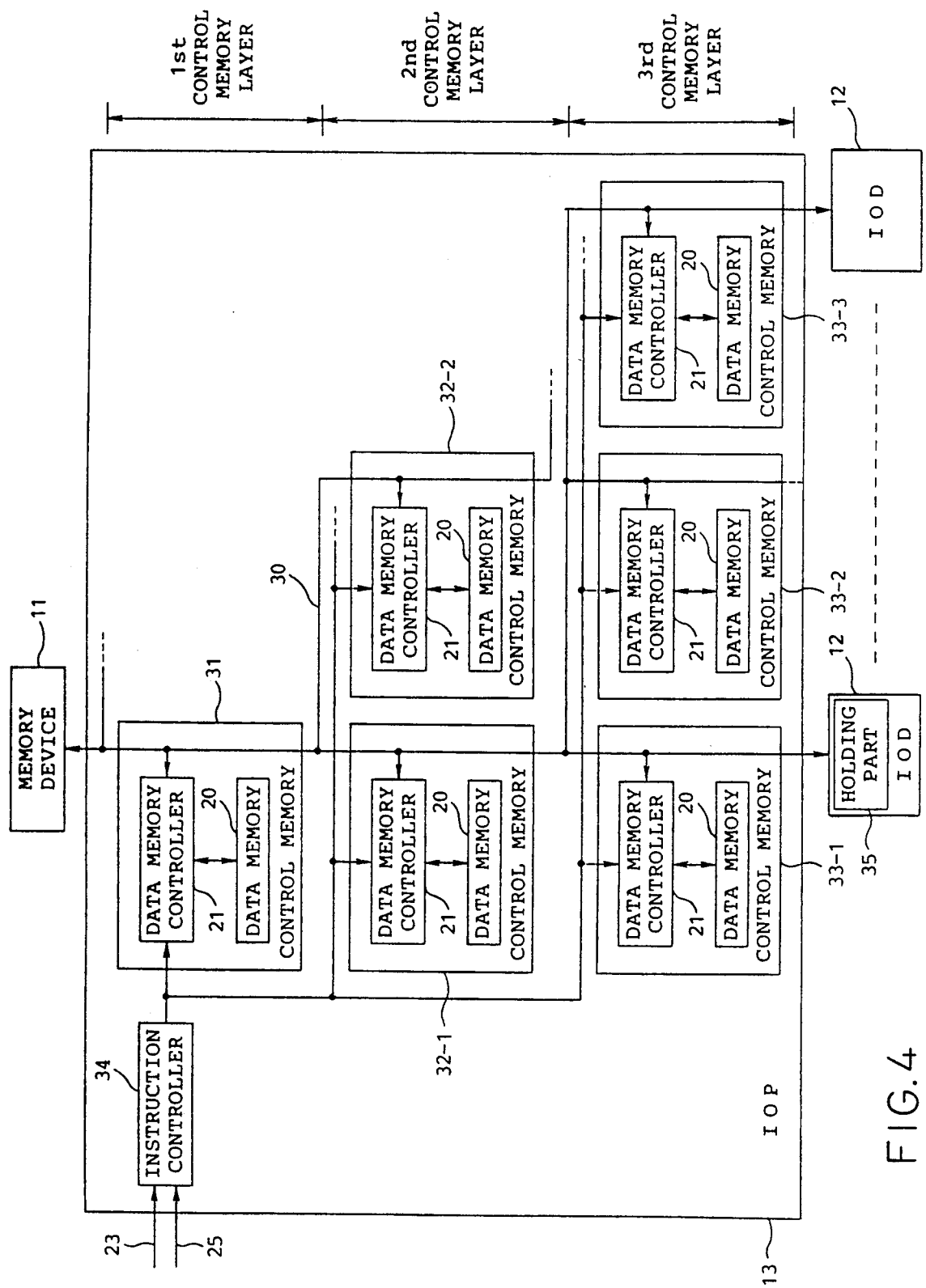
FIG. 4 is a block diagram of a data processing system according to a third embodiment of this invention.

Referring to FIG. 4, a data processing system according to a third embodiment of this invention is similar to the data processing system illustrated in FIG. 3 except that the instruction controller 34 is not directly connected to the holding part 35 included in one of the input-output devices 12. By each data memory controller 21, the instruction controller 34 is operatively connected to the data path 30 to which the holding part 35 is connected. Responsive to the firmware load instruction 23, the instruction controller 34 reads the first through the third firmware data from the holding part 35 as the first through the third read-out data, respectively. The instruction controller 34 makes the control memories 31, 32, and 33 of the first through the third control memory layers memorize the first through the third read-out data, respectively, through the data path 30.

In this event, the instruction controller 34 makes at least one control memory of each of the first through the third control memory layers memorize each of the first through the third read-out data through the data path 30 successively from the third control memory layer to the first control memory layer in the manner which will be described hereunder.

Responsive to the firmware load instruction 23, the instruction controller 34 delivers a firmware load command to the data memory controller 21 of the control memory 33-1 of the third control memory layer. Responsive to the firmware load command, the data memory controller 21 of the control memory 33-1 delivers a firmware data request to the holding part 35 through the data path 30. Responsive to the firmware data request, the holding part 35 delivers the third read-out data to the data memory controller 21 of the control memory 33-1 through the data path 30. The data memory controller 21 of the control memory 33-1 stores the third read-out data in the data memory 20 of the control memory 33-1.

Subsequently, third read-out data are sent from the control memory 33-1 to the control memories 33-2 and 33-3 through the data path 30 and are simultaneously stored in the data memories 20 of the control memories 33-2 and 33-3 by the data memory controllers 21 of the control memories 33-2 and 33-3 under control of the control memory 33-1.

Thereafter, the second read-out data are stored in the data memory 20 of the control memory 32-1 by the data memory controller 21 of the control memory 32-1 under control of the control memory 33-1. The second read-out data are sent from the control memory 32-1 to the control memory 32-2 through the data path 30 and are stored in the data memory 20 of the control memory 32-2 by the data memory controller 21 of the control memory 32-2 under control of the control memory 33-1.

Subsequently, the first read-out data are stored in the data memory 20 of the control memory 31 by the data memory controller 21 of the control memory 31 under control of the control memories 33-1 and 33-2. In this manner, firmware load operation comes to an end. As a result, the data processing system becomes to the ready state.

While this invention has thus far been described in conjunction with a few preferred embodiments thereof, it will readily be possible for those skilled in the art to put this invention into practice in various other manners. For example, the first control memory layer of the input-output processor 13 of the data processing system illustrated in each of FIGS. 2, 3, and 4 may comprise a plurality of control memories. The second or the third control memory layer of the input-output processor 13 of the data processing system illustrated in each of FIGS. 2, 3, and 4 may comprise only one control memory.

What is claimed is:

1. A data processing system for transferring input-output data between a memory device and input-output devices through a data path between said memory device and said input-output devices, comprising:

holding means for holding first through N-th firmware data;

an input-output processor comprising first through N-th control memory layers corresponding to said firth through said N-th firmware data, where N represents an integer greater than one, each of said first through said N-th control memory layers comprising at least one control memory connected to said data path, said input-output processor controlling transfer of input-output data between said memory device and said input-output devices through said data path when said first through said N-th firmware data are stored in said control memories of said first through said N-th control memory layers, respectively, and said input-output processor further comprising data controlling means connected to said holding means and responsive to a firmware load instruction for issuing a read-out command for said first through said N-th firmware data to be read from said holding means as first through N-th read-out firmware data, respectively;

said holding means being connected to said memory device and responsive to said read-out command for providing said memory device with said first through said N-th read-out firmware data, said memory device storing said first through said N-th read-out firmware data as first through N-th memorized firmware data, respectively;

said data controlling means being connected to the control memories of said first through said N-th control memory layers to store said first through said N-th memorized firmware data in said control memories of said first through said N-th control memory layers, respectively, through said data path, a control memory of one layer controlling transferring of said memorized firmware data to a control memory of another layer, through said data path.

2. A data processing system as claimed in claim 1, wherein said data controlling means makes said at least one control memory of each of said first through said N-th control memory layers simultaneously memorize a corresponding one of said first through said N-th memorized data through said data path.

3. A data processing system as claimed in claim 2, the control memories of said first through said N-th control memory layers being connected to said data path with each control memory of an n-th control memory layer connected to said data path farther from said memory device than each control memory of an (n−1)-th control memory layer, where n represents each of natural numbers between two and said integer, wherein said data controlling means makes all of said at least one control memory of each of said first through said N-th control memory layers simultaneously memorize a corresponding one of said first through said N-th memorized data through said data path successively from said first control memory layer to said N-th control memory layer.

4. A data processing system as claimed in claim 1, each control memory comprising a data memory and data memory controlling means connected to said data memory for controlling storage of a corresponding one of said first through N-th firmware data in said data memory, wherein:

said data memory controlling means is connected to said data path;

said data controlling means being connected to said data memory controlling means to make said data memory controlling means store each of said first through said N-th memorized data in said data memory of said at least one control memory of a corresponding one of said first through said N-th control memory layers through said data path.

5. A data processing system for transferring input-output data between a memory device and input-output devices through a data path between said memory device and said input-output devices, comprising:

holding means for holding first through N-th firmware data, said holding means being included in one of said input-output devices with said holding means connected to said data path;

an input-output processor comprising first through N-th control memory layers corresponding to said first through said N-th firmware data, where N represents an integer greater than one, each of said first through said N-th control memory layers having at least one control memory connected to said data path, said input-output processor controlling transfer of input-output data between said memory device and said input-output devices through said data path when said first through said N-th firmware data are stored in the control memories of said first through said N-th control memory layers, respectively, and said input-output processor further comprising data controlling means connected to said holding means and responsive to a firmware load instruction for issuing a read-out command for said first through said N-th firmware data to be read from said holding means as first through N-th read-out firmware data, respectively, said data controlling means being connected to the control memories of said first through said N-th control memory layers to store said first through said N-th read-out firmware data in the control memories of said first through said N-th control memory layers, respectively, through said data path, a control memory of one layer controlling transferring of said read-out firmware data to a control memory of another layer, through said data path.

6. A data processing system as claimed in claim 5, wherein said data controlling means makes said at least one control memory of each of said first through said N-th control memory layers simultaneously memorize a corresponding one of said first through said N-th read-out data through said data path.

7. A data processing system as claimed in claim 6, the control memories of said first through said N-th control memory layers being connected to said data path with each control memory of an n-th control memory layer connected to said data path farther from said memory device than each control memory of an (n−1)-th control memory layer, where n represents each of natural numbers between two and said integer, wherein said data controlling means makes all of said at least one control memory of each of said first through said N-th control memory layers simultaneously memorize a corresponding one of said first through said N-th read-out data through said data path successively from said first control memory layer to said N-th control memory layer.

8. A data processing system as claimed in claim 5, each control memory comprising a data memory and data memory controlling means connected to said data memory for controlling storage of a corresponding one of said first through said N-th firmware data in said data memory, wherein:

said data memory controlling means is connected to said data path;

said data controlling means being connected to said data memory controlling means to make said data memory controlling means store each of said first through N-th read-out data in the data memory of said at least one control memory of a corresponding one of said first through said N-th control memory layers through said data path.

9. A data processing system for transferring input-output data between a memory device and input-output devices through a data path between said memory device and said input-output devices, comprising:

holding means for holding first through N-th firmware data, said holding means being included in one of said input-output devices with said holding means connected to said data path;

an input-output processor comprising first through N-th control memory layers corresponding to said first through N-th firmware data, where N represents an integer greater than one, each of said first through said N-th control memory layers comprising at least one control memory connected to said data path, said input-output processor controlling transfer of input-output data between said memory device and said input-output devices through said data path when said first through said N-th firmware data are stored in the control memories of said first through said N-th control memory layers, respectively, and said input-output processor further comprises data controlling means operatively connected to said data path through said at least one control memory connected to said data path and responsive to a firmware load instruction for issuing a read-out command for said first through said N-th firmware data to be read from said holding means as first through N-th read-out firmware data, respectively, said data controlling means being connected to the control memories of said first through said N-th control memory layers to store said first through said N-th read-out firmware data in the control memories of said first through said N-th control memory layers, respectively, through said data path, a control memory of one layer controlling transferring of said read-out firmware data to a control memory, of another layer, through said data path.

10. A data processing system as claimed in claim 9, the control memories of said first through said N-th control memory layers being connected to said data path with each control memory of an n-th control memory layer connected to said data path farther from said memory device than each control memory of an (n−1)-th control memory layer, where n represents each of natural numbers between two and said integer, wherein said data controlling means makes said at least one control memory of each of said first through said N-th control memory layers memorize a corresponding one of said first through said N-th read-out data through said data path successively from said N-th control memory layer to said first control memory layer.

* * * * *